United States Patent [19]
Jamas et al.

[11] Patent Number: 6,143,731
[45] Date of Patent: Nov. 7, 2000

[54] GLUCAN DIETARY ADDITIVES

[75] Inventors: Spiros Jamas, Boston; D. Davidson Easson, Jr., Shrewsbury; Bruce R. Bistrian, Ipswich, all of Mass.

[73] Assignee: The Collaborative Group, Ltd., Stony Brook, N.Y.

[21] Appl. No.: 09/361,831

[22] Filed: Jul. 27, 1999

Related U.S. Application Data

[63] Continuation-in-part of application No. 07/675,913, Apr. 26, 1991, Pat. No. 6,020,324, and a continuation of application No. PCT/US89/04734, Oct. 20, 1989.

[51] Int. Cl.$^7$ .......................... A01N 43/04; A01N 37/00; C12Q 1/00
[52] U.S. Cl. ................ 514/54; 514/25; 514/557; 514/558; 536/1.11; 426/60; 426/62; 435/940; 435/941; 435/942; 435/943; 435/4
[58] Field of Search ................. 514/54, 25, 557, 514/558; 536/1.11; 426/60, 62; 435/940, 941, 942, 943, 4

[56] References Cited

U.S. PATENT DOCUMENTS

| | | | |
|---|---|---|---|
| 4,891,220 | 1/1990 | Donzis | 514/54 |
| 6,020,324 | 2/2000 | Jamas et al. | 514/54 |

*Primary Examiner*—Louise N. Leary
*Attorney, Agent, or Firm*—Hamilton, Brook, Smith & Reynolds, P.C.

[57] ABSTRACT

Compositions useful in the treatment of dietary disorders, and as dietary additives to provide a source of fiber and of short chain fatty acids, to reduce the level of serum cholesterol, increase HDL cholesterol levels and as bulking agents in humans and animals, as well as methods of use therefor are described. The compositions and methods are based on whole β-glucans.

20 Claims, 2 Drawing Sheets

GLUCAN DIETARY ADDITIVES

RELATED APPLICATIONS

This application is a continuation-in-part of U.S. Ser. No. 07/675,913 filed on Apr. 26, 1991 now U.S. Pat. No. 6,020,324, which is a continuation of PCT/US89/04734, filed Oct. 20, 1989, the entire teachings of which are incorporated herein.

BACKGROUND OF THE INVENTION

Certain natural fibers benefit digestive function, help prevent intestinal and colon cancer and act as fecal gastroenteral bulking agents. Generally, fibers are derived from grains, and are composed of polysaccharides with a range of structures. The role of fiber in health has become well recognized; however, its mechanisms of action are not completely understood.

Yeast cell walls are largely made up of the hydrophilic polysaccharide beta-glucan. The cell wall is primarily composed of a (1–3)-linked glucose polymer with periodic β(1–6)-linked side chains. A similar polysaccharide can be found in grains, such as barley, which are common sources of dietary fiber.

The term "fiber" refers generally to a diverse, complex group of substances whose single common attribute is their resistance to human digestive enzymes. The important physiological effects of fibers are related to this characteristic, as well as to water and ion-binding capacity, viscosity, and the products of their fermentation in the bowel. E. Bright—See, *Nutrition Today,* 4:4–10 (1988). The implication is that fiber increases bulk, dilutes colonic contents, speeds transit time and changes bacterial metabolism, possibly providing protection from some diseases of the gut. Furthermore, diets high in fiber are usually lower in animal products, (i.e., saturated fat, cholesterol). By replacing or reducing these fats, protection against heart disease is enhanced. P. M. Kris-Etherton et al., *Journal of the American Dietetics Association,* 88:1373–1400 (1988); S. Bingham, *American Journal of Clinical Nutrition,* 45:1226–1231 (1987). Dietary fiber can alter lipid metabolism by interfering with cholesterol absorption, changing lipoprotein lipase activity or fatty acid metabolism. Also, fiber has been seen to lower blood glucose levels, alter hormonal levels and influence carbohydrate metabolism. Epidemiological evidence does suggest a link between reduced incidence of chronic heart disease and colon cancer in populations consuming high fiber diets. T. A. Miettinen, *American Journal of Clinical Nutrition,* 45:1232–1236 (1987). Most authorities agree that dietary fiber intake should be increased from the current average of 10–20 gm/day to 25–30 gm/day, but not to exceed 45 gm/day. For most, this can be safely accomplished by consuming a variety of foods containing fiber.

It is known that a diet high in fiber is beneficial for a variety of reasons. Dietary fiber aids digestion because it provides an indigestible biomass which is carried through the alimentary canal causing undigested food to be pushed out before it. Fiber also clears out bacteria and insures the proper working of the peristaltic muscles. A diet high in fiber has been shown to reduce serum cholesterol and triglyceride levels, and has been linked to lower rates of intestinal and colon cancer. A high fiber diet has also been linked to the reduction of other problems commonly associated with poor digestion, such as ulcer formation, ileitis and colitis.

Dietary fiber is particulary important for persons on a liquid diet, such as, for example, a patient who received nourishment through a feeding tube due to inadequate function of the gastrointestinal tract, with or without protein calorie malnutrition. A common side effect for those patients who do not receive any fiber supplement is chronic diarrhea due to lack of bulk. This condition may cause depletion of essential nutrients in the patient, dehydration and bowel irritation. Some dietary fibers can be used as a stool or fecal bulking agent to aid digestion and control chronic diarrhea. A fiber having a large water holding capacity is useful for this purpose, because these fibers absorb excess fluid in the colon resulting in increased fecal wet weight and stool number. Furthermore, some fibers are partially digested by bacteria in the large bowel, forming short chain fatty acids, which are preferred energy fuels for the small intestine and improve intestinal function.

Grain β-glucans are commonly used as a source of fiber. Another source of β-glucans is yeast cell walls; however, yeast β-glucans have not been used as a dietary fiber supplement due to the fact that yeast cell wall glucans prepared by traditional methods, such as the method described by Manners et al., in *Biochem. Journal,* 135:19–30 (1973), are not pure, and generally contain materials such as protein, glycogen and chitin. Also, the water-holding capacity of β-glucans prepared previously is low due to the presence of hydrophobic components such as protein and glycogen, and due to the lack of any three-dimensional cell wall micro-structure. Functionality and purity of a compound to be used for non-irritating, food-grade, fiber preparations are essential to ensure acceptable performance and qualitative properties, such as bland taste and white coloration.

SUMMARY OF THE INVENTION

The present invention is based on the discovery that whole β-glucans are surprisingly useful as dietary additives. Dietary supplements containing whole β-glucans, when administered to animals and humans, provide a source of fiber in the diet, provide a fecal bulking agent, provide a source of short chain fatty acids, reduce cholesterol and LDL, and raises HDL levels in animals and humans.

In addition, this invention includes a method for providing a source of fiber in the diet, for reducing body weight, providing a fecal bulking agent, for providing a source of short chain fatty acids and/or for lowering total plasma and/or low-density lipoprotein (LDL) cholesterol and/or for raising HDL by administering whole yeast β-glucan to an individual. Whole glucans are significantly more effective in reducing body weight or weight gain in animals when compared to commercially available fibers such as oat bran or wheat bran. The whole glucans used in this composition and method can be naturally-occurring or unmodified β-glucans, or can be chemically or enzymatically modified, by altering the P(1–6) and P(1–3) linkages. For example, partial acid hydrolysis or digestion with enzymes can be used to modify the β(1–6) or β(1–3) linkages, respectively. Such modifications useful to control the water holding capacity of the whole glucan, thereby regulating the degree of gastroenteral bulking.

More importantly, the relative proportions of P(1–6) and (1 –3) linkages in whole β-glucan can be altered by genetic modification of the yeast from which it is derived. Mutant cells which exhibit changes in the structure of the yeast cell wall can be isolated by evaluating their resistance to digestion by hydrolytic enzymes. The changes in the structure of the whole β-glucans may be reflected in the shape of the extracted whole cell walls, in the water-holding characteristics or in the extent of bacterial conversion to short chain fatty acids. Whole β-glucans extracted from mutant cells can then be used as dietary additives for purposes commensurate with their properties.

The dietary additives of the present invention are based on the three-dimensional matrix structure of whole glucan, which is unique to whole glucan, and cannot be mimicked by other naturally occurring polysaccharides, including other β-glucan preparations. The composition and method of this invention utilize whole yeast glucan as a dietary additive to improve digestion or treat digestive disorders. For example, the composition can be used to: 1) provide a source of dietary fiber; 2) provide a source or fecal bulking agent; and 3) provide a source of short chain fatty acids via bacterial fermentation in the large bowel, which improves digestion and benefits intestinal and colonic endothelial cells. The present composition and method also effectively lowers total plasma and/or LDL cholesterol and raises HDL, and reduces body weight or inhibits weight gain.

The whole β-glucans of the invention can be administered neat, in a biologically acceptable carrier or as part of a complete nutritional food.

Whole β-glucans have important properties that make them ideally suited for use as dietary supplements. For example, they have a high water-holding capacity, they are non-gelling, the water holding capacity can be easily adjusted, and they are natural and highly pure. Whole β-glucans provide a number of coincidental, beneficial effects. They provide, in combination, a source of fiber, a fecal bulking agent, a source of short chain fatty acids to improve digestion and stimulate mucosal proliferation in the intestine and a cholesterol-lowering effect while at the same time increase the beneficial cholesterol (HDL). Whole glucans provide a uniquely concentrated source of dietary fiber which can be used to control weight gain when incorporated into a high-fat or hypercaloric diet. Whole β-glucans are obtained from yeast cell walls using a purification process which does not disrupt the three-dimensional cell wall matrix in the process of extracting the non-glucan components, thus enhancing their functionality as a water-absorbing and bulking agent.

Figure 1:
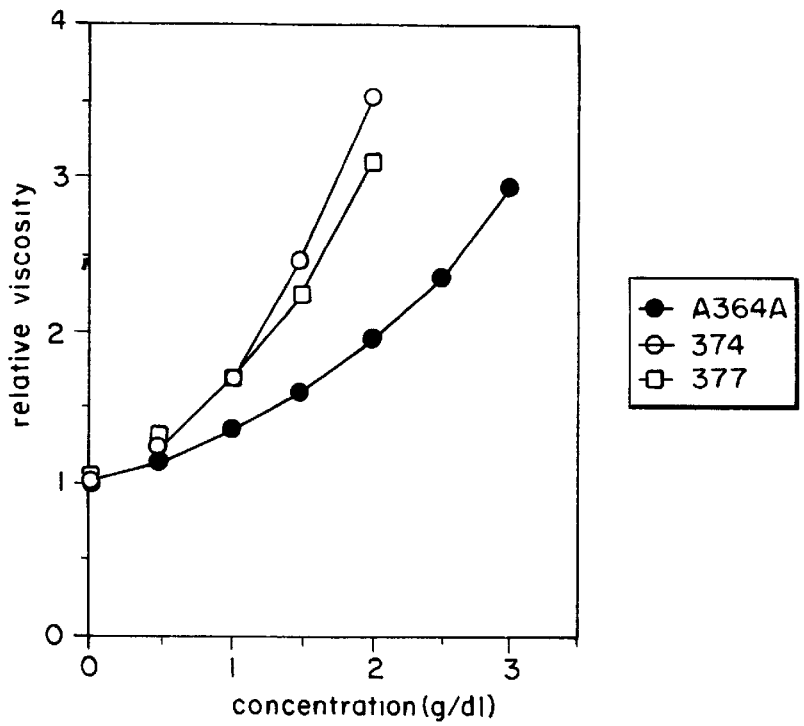
FIG. 1 shows a plot illustrating the viscosity profiles of whole β-glucans obtained from *Saccharomyces cerevisiae* A364A, 374 and 377.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

"Whole β-glucans" are glucans which maintain the intact, three-dimensional in vivo morphology of the cells from which they are derived. Whole β-glucans (also referred to herein as "whole glucans") are obtained from the cell walls of glucan-containing organisms using a purification process which does not disrupt the integrity of the cell walls in the process of extracting the non-glucan components.

Yeast cell walls are composed predominantly of glucans, which are glucose polymers, having mainly β(1–3) linkages with a smaller component of β(1–6) linkages. Whole β-glucan is the alkali-insoluble portion which can be derived intact from yeast cell walls using the process described by S. Jamas et al. in U.S. Pat. Nos. 4,810,646, 4,992,540, 5,028,703, 5,037,972, 5,082,936, 5,260,436 and 5,506,124, the teachings of which are incorporated herein by reference. This process yields intact particles of β-glucan, which maintain the spherical, elliptical or rod shaped configuration of the β-glucan as found in vivo, which is referred to as whole glucan. Whole glucan is comparable in size and shape to whole yeast cells, and is composed almost entirely of β-glucan. These hollow, three-dimensional particles are conductive to a high water holding capacity, in that they become filled with water upon hydration. The viscosity of an aqueous solution of whole glucan is indicative of its water holding capacity. Viscosity profiles of β-glucans derived from three different strains of *Saccharomyces cerevisiae* are shown in FIG. 1.

β-glucans obtained using this process are also very pure. The occurrence of other cell wall components, including glycogen, protein and chitin, is minimized when this process is used. Glycogen, protein and chitin are undesirable as the presence of these components tend to reduce the water holding capacity and the effective dietary fiber content of β-glucans.

Highly pure, whole β-glucans having a very high water holding capacity and high dietary fiber content can be obtained from any yeast strain. For example, the following strains, and mutants or variants derived from them, will yield whole β-glucans: *Saccharomyces cerevisiae, Saccharomyces delbrueckii, Saccharomyces rosei, Saccharomyces microellipsodes, Saccharomyces carlsbergensis, Schizosaccharomyces pombe, Kluyveromyces lactis, Kluyveromyces fragilis, Kluyveromyces polysporus, Candida albicans, Candida cloacae, Candida tropicalis, Candida utilis, Hansenula wingei, Hansenula arni, Hansenula henricii* and *Hansenula americans*. This whole β-glucan retains the three-dimensional morphology of the yeast cell wall in vivo, since the Jamas et al. extraction process does not cause rupture of the yeast cell walls. The β-glucan product obtained from this process is typically about 96–99% pure; and, since the cell wall structure is intact, it also has a significantly higher water holding capacity than glucans extracted using traditional methods, which lack the intact three-dimensional structure.

Whole yeast β-glucans have several important properties that make them ideally suited to function as dietary supplements. Whole β-glucans are natural, very pure, exhibit a high water holding capacity and are non-gelling. They are wholly composed of glucose units bonded together by β(1–3) and β(1–6) glycosidic linkages, which cannot be degraded by human digestive enzymes, thus making them suitable as a source of dietary fiber.

Additionally, as whole β-glucans pass through the large bowel, they can be partially digested by endogenous colonic bacteria without significant loss of their water holding properties. This fermentation process gives rise to short chain fatty acids (predominantly acetate, propionate and butyrate) which are beneficial to mucosal cells lining the intestine and colon. Sakata, T. and Engelhardt, W. V., *Comp. Biochem. Physiol.*, 74a:459–462 (1983).

Whole β-glucans are able to absorb more than ten times their weight in water, which is useful in oral and tube feeding formulations and digestive aids to act as a stool bulking agent, and, thus, as a preventative to diarrhea. For example, whole glucan has a water holding capacity of between about 3 to about 12 ml/gram of dry material, but does not exhibit gelling properties, thus allowing it to be incorporated into liquid formulations at significantly higher levels than possible with existing fibers such as soy polysaccharide, psyllium fiber and other plant or grain fibers. Therefore, a typical daily dose for humans of from about 5 to about 50 grams of whole β-glucan can absorb from about 15 to about 600 ml of water from the gastrointestinal tract depending on the desired function for the user. For example, the functional properties of the whole glucan can be varied between high fiber/low bulking to high fiber/high bulking functions.

The water holding capacity of whole glucan can be altered by genetic, chemical or enzymatic modification, as described by Jamas et al. in U.S. Pat. Nos. 4,810,646, 4,992,540, 5,082,936 and 5,028,703 by Jamas et al, in *Biotechnology and Bio-engineering*, 28:769–784 (1986); the teachings of all of which are incorporated herein by reference. For example, whole glucan can be treated with an acid, such as acetic acid, after its extraction from yeast to reduce the degree of β(1–6) crosslinking, thereby increasing the water holding capacity of the whole glucan. Likewise, treatment with hydrolytic enzymes, such as laminarinase or β(1–3) glucanases, reduces the degree of β(1–3) linkages of the whole glucan, resulting in a decrease in the viscosity profile (see FIG. 2) and thus, a decrease in the water holding capacity of whole glucan.

Figure 3:
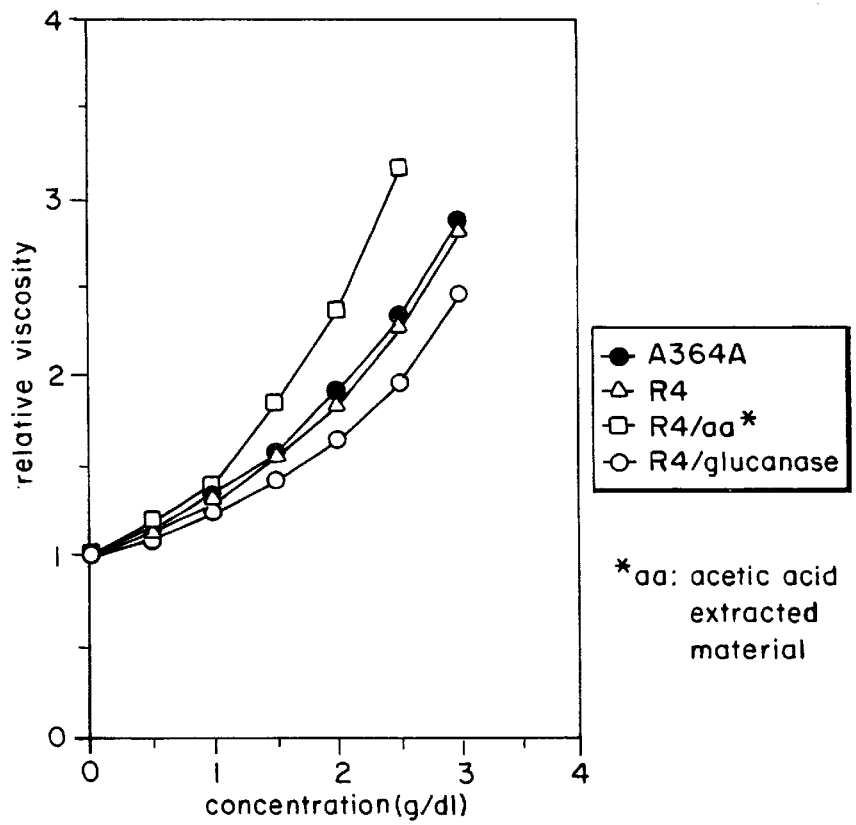
FIG. 3 shows a plot illustrating the viscosity profiles of whole β-glucans obtained from *Saccharomyces cerevisiae* A364A and R4 including viscosity profiles of R4 after treatment with acetic acid and glucanase.

The properties of whole glucans can be altered by genetic modification of the yeast cells from which they are derived. A culture of yeast cells can be induced to mutate by applying a mutating agent, such as ultraviolet radiation, for example. Changes in the structure of the yeast cell wall induced by the mutation can then be evaluated for effect on the morphology and structure of the whole β-glucan extracted from the mutant yeast. These changes may be reflected in the shape of the extracted whole cell walls, the degree of cross-linking, in the viscosity profile (see FIG. 3) which relates directly to water-holding capacity, and/or in the extent of bacterial conversion to short chain fatty acids. β-glucans extracted from the mutant cells can then be used as dietary additives for purposes commensurate with their properties. For example, a mutant strain of yeast, *Saccharomyces cerevisiae* R4 (NRRL Y-15903 Agricultural Research Service Culture Collection, 1815 N. University Street, Peoria, Ill.), was created by exposing a culture of *Saccharomyces cerevisiae* A364A cells to UV light for 25 seconds, as described by S. Jamas et al. in U.S. Pat. Nos. 4,810,646 and 5,028,703, by S. Jamas et al. in *Biotechnology and Bioengineering*, 28:769–784 (1986). The R4 mutant shows increased β(1–6) linkages in the glucan structure, which affects its degree of digestibility, and the resultant yield of short chain fatty acids in the large intestine. Mutant yeast cells may be produced by other methods known in the art.

By treating the glucans with mild acids, such as acetic acid, or glucanase enzymes such as laminarinase, to alter the β(1–6) or β(1–3) linkages, respectively, or inducing or isolating mutant yeast strains having altered β-glucan structures, it is possible to control the hydrodynamic properties of whole glucan, and to control product viscosity precisely for a particular end usage. Therefore, the degree of bulking, for example, can be controlled by administering whole glucan modified to have the desired water holding capacity.

The multiple functionality of whole glucans as a source of short chain fatty acids and as a hydrophilic water absorbing agent makes them valuable as dietary additives acting as a fiber supplement and/or a stool bulking agent that enhances bowel function. Enzymatic modification of whole glucan can allow a range of digestibility (from about 15 to about 70% metabolizable glucose) and water holding capacity (from about 3 to about 12 ml/g of dry material). These properties can be utilized individually or in combination depending on the specific application. In addition, the present whole glucans can be used to lower total cholesterol and LDL levels in individuals with hypercholesterolemia, while increasing the beneficial HDL cholesterol. Whole glucans can be administered alone or in conjunction with a lipid-lowering diet to lower total plasma and LDL cholesterol and/or to raise HDL levels.

A dietary additive, or supplement, is defined for present purposes as a food material which is administered to or taken by an animal or human to induce a beneficial or desirable physical effect or to supply one or more components which are missing in the individual's diet.

The present whole glucan preparations can be administered orally, or enterally. The form in which the glucan will be administered (e.g., powder, tablet, capsule, suspension, solution, emulsion) will depend on the patient and the particular treatment. The quantity of the composition to be administered will be determined on an individual basis, and will be based in part on consideration of the condition of the subject, the subject's overall health, and the severity of the disorder being treated. The amount of the whole β-glucans administered to an individual to provide a source of fiber should be the amount necessary to provide all or part of the individual's fiber requirement to aid digestion by providing an indigestible biomass to clear undigested food and other debris from the gastrointestinal tract; ensure the proper function of the gastrointestinal tract; prevent dehydration and/or bowel irritation in the individual; clear out bacteria and aid proper working of the peristaltic muscles; prevent diarrhea, which can occur when there is insufficient fiber in the diet; and/or to reduce serum cholesterol and triglyceride levels and increase HDL levels. The amount of whole β-glucans administered to an individual as a bulking agent should be the amount necessary to provide water-adsorbing bulk to prevent dehydration and bowel irritation in the individual; to aid digestion; and to increase fecal wet weight and stool number, and to thereby control chronic diarrhea caused by excess fluid in the digestive system. For example, dosage levels can be from about 5 to about 50 grams of whole β-glucans per day to provide a source fiber in the diet and/or as a bulking agent. The amount of whole β-glucans administered to an individual as a source of short-chain fatty acids should be the amount necessary to aid digestion and improve intestinal function and stimulate proliferation of mucosal cells in the intestines. The amount of whole β-glucans administered to an individual to reduce serum cholesterol should be the amount necessary to cause a reduction in total plasma and LDL cholesterol, and/or increase HLD levels. When added to a high-cholesterol and/or high-fat containing diet, about 5% to about 8% by weight (based on total weight of food ingested) of whole glucan was more effective than wheat bran or oat bran at reducing total plasma and LDL cholesterol levels. The amount of whole β-glucan administered to an individual to promote weight loss or reduce weight gain should be that amount necessary to aid digestion, increase fecal wet weight, speed transit time of undigested food and insure the proper working of peristaltic muscles. For example, when added to a high-fat diet, about 5 to about 8% by weight (based on total food intake) of whole β-glucan was more effective than wheat or oat bran in reducing body weight and weight gain.

The composition may be administered orally, in liquid or solid form, either at room temperature or chilled, or enterally through a feeding tube. Glucan as a source of fiber can be administered alone, in a biologically acceptable carrier (e.g., saline or water) with other ingredients such as vitamins and minerals, or as part of a complete-nutritional food. For example, whole glucan can be administered as a component in a high fiber liquid food for oral or enteral feeding, by continuous or intermittent drip into a feeding tube (e.g., nasogastric, nasoduodenal, jejunal). Liquid formulations generally contain about 5 g whole glucan per 8 fluid ounces.

The composition of the present invention can optionally include, in addition to whole β-glucan, other components, which will be determined primarily by the manner in which the composition is to be administered. For example, a composition to be administered orally in tablet or powder form can include, in addition to whole β-glucan, a filler (e.g., corn starch, sucrose, lactose), a binder (e.g., carboxymethyl cellulose, gum arabic, gelatin), an adjuvant, a flavoring agent, a coloring agent, and/or a coating material (e.g., wax or plasticizer) and/or other nutritional supplements. A composition to be administered in liquid form can include whole β-glucan and, optionally, an emulsifying agent, a diluent (e.g., water, sterile saline) and/or a coloring or flavoring agent, or combined in a complete feeding formula to be administered orally or by feeding tube into the digestive tract. A complete feeding formula can contain all nutritional requirements. For example, such a feeding formula for oral or enteral administration could contain whole glucan (as the source of dietary fiber), water, a source of carbohydrate (e.g., sucrose, hydrolyzed corn starch), an oil (e.g., corn or soybean oil), selected sources of vitamins (e.g., choline, chloride, ascorbic acid, alpha-tocophenyl acetate, niacinamide, calcium pantothenate, thiamine, riboflavin, phylloquinone, cyanocobalamin, vitamin $D_3$); selected sources of minerals (e.g., potassium citrate, magnesium chloride, calcium phosphate tribasic, sodium citrate, potassium chloride, zinc sulfate); a source of protein (e.g., soy protein isolate, calcium caseinate), and lecithin.

For a complete nutritional liquid food, to be used as the sole source of nutrition, the dosage for an average adult can be between about 1500–2000 calories per day. A complete nutritional formulation can have the following caloric distribution:

| Liquid Nutrition Plus Fiber - Enteral Feeding Complete Nutritional Formulation | | |
| --- | --- | --- |
| Contents | Grams/Liter | % of Total Calories |
| Protein | 20–60 | 8–23 |
| Fat | 1–100 | 1–90 |
| Carbohydrate | 40–220 | 20–91 |
| Glucan | 10–50 | 0–10 |
| Vitamins* | RDA | 0 |
| Minerals* | RDA | 0 |
| Water | 800–950 | 0 |

*Provide recommended dietary allowance of all essential vitamins and minerals.

For most individuals the calorie distribution can be: about 14–15% protein, about 30–32% fat and about 53–56% carbohydrate.

The invention is illustrated further by the following examples, which are not to be taken as limiting in any way. All references referred to herein are incorporated by reference in their entirety.

EXAMPLE 1

Composition of Whole β-glucans from Strains *Saccharomyces Cerevisiae* A364A and R4

Whole β-glucan was extracted from strains *Saccharomyces cerevisiae* A364A and R4 according to the process described by Jamas et al. in U.S. Pat. No. 4,810,646.

Protein and Hexose Content of Whole Glucans

Protein content of the whole β-glucans was determined chemically using the Bio-Rad assay (Bio-Rad, Richmond, Calif.). In this procedure, glucan samples were suspended in water to a concentration of 5 mg/ml, and lysozyme solutions in the range of 0.2 to 1.0 mg/ml were prepared as standards. Duplicate 0.1 ml aliquots of the samples and standards were placed in clean, dry test tubes and 5.0 ml of the diluted dye reagent was added. The solutions were vortexed, and after 5 minutes, the optical density (O.D.) was measured at 595 nm. A water blank was used as a negative control.

Total hexose was measured in duplicate 100-fold dilutions of the glucan suspensions. A standard curve was prepared using glucose solutions in the range of 10–100 µg/ml. Duplicate 1 ml aliquots of the samples were placed in clean, dry test tubes and 1 ml of 5% (v/v) phenol was added. Then 5 ml of concentrated sulfuric acid ($H_2SO_4$) was added to each tube, the mixture was vortexed, and incubated at 37° C. for 15–20 minutes. The optical density was measured at 488 nm with a water sample as the blank. The results are shown in Table 1.

TABLE 1

| PROTEIN CONTENT | | | |
| --- | --- | --- | --- |
| Preparation | Protein mg/ml | Hexose mg/ml | Hexose/Protein Ratio | % Protein |
| A364A | 0.071 | 8.74 | 123:1 | 0.80 |
| R4 | 0.082 | 8.81 | 108:1 | 0.91 |

Chitin and Glycogen Content

Fourier-Transform Infrared (FT-IR) spectroscopy was used to detect the presence of chitin and glycogen, and peak integration was used to determine their relative levels. The characteristic glycogen peaks, which appear at a wave number of 850, 930 and 760 $cm^{-1}$, were not detected in the whole β-glucan preparations, but were clearly present in the glucans extracted using an alternate process described by Manners et al. in *Biochem. J.*, 135: 19–30 (1973) (hereinafter the "Manners' preparation"). In addition the characteristic chitin peak, which appears at a wave number of 1550 $cm^{-1}$ was significantly stronger in the Manners' preparation. The results are shown in Table 2.

TABLE 2

| CONTAMINANT LEVELS DETECTED BY FT-IR SPECTOSCOPY | | |
| --- | --- | --- |
| Contaminant | Whole Glucan | Manner's Prep |
| Glycogen | 1.0 | 9.4 |
| Chitin | 1.0 | 2.9 |

Manner's preparation contains an approximately 10-fold higher level of glycogen, and a 3-fold higher level chitin over the whole glucan preparation. Table 3 illustrates the significant compositional differences resulting from these procedures:

TABLE 3

COMPARISON OF BETA-GLUCAN PREPARATIONS

| Component Content | Whole glucan mg | Whole glucan % | Manner's Prep. mg | Manner's Prep. % |
|---|---|---|---|---|
| Glucan | 1000 | 96.2 | 1000 | 51.8 |
| Protein | 2 | 0.8 | 351 | 18.2 |
| Glycogen | 31 | 2.9 | 579 | 30.0 |

Based on 1000 mg samples of glucan, the whole glucan sample contained only 33 mg of contaminants, whereas the Manner's preparation contained 930 mg. The contaminant mass displaces its weight in water from the glucan particles, so that the contaminated glucan has a considerably lower water holding capacity.

EXAMPLE 2
Treatment of Whole Glucan with Acetic Acid

Five hundred mg samples of whole glucan from *S. cerevisiae* prepared as described in Example 1, from strains 374, 377 and R4, were suspended in 250 ml of 0.5M acetic acid. The suspensions were continuously stirred at 90° C. for 3 hours. At the end of this extraction, the remaining insoluble glucan residue was recovered by batch centrifugation at 5000 rpm for 20 minutes. The glucan residue was washed once in 200 ml distilled water, once in 200 ml dehydrated ethanol and twice in 200 ml dehydrated ethyl ether.

The resulting slurry was dried in air at 37° C. for 12 hours. The initial suspension in acetic acid and the supernatant were assayed for total carbohydrate content to determine the proportion of the extractable β(1–6) glucan component. The white glucan powder obtained after drying was resuspended in distilled water to determine its viscosity profile (see FIG. 3). The results are shown in Table 4. As indicated by the results, the mild acid treatment increases the water holding capacity of the whole glucans by approximately 20% and therefore will have a commensurate effect on their bulking properties

TABLE 4

VISCOSITY PROFILES OF GLUCANS BEFORE AND AFTER ACETIC ACID TREATMENT

| Yeast Strain | Viscosity in Centipoise, 25° C. | | | |
|---|---|---|---|---|
| | 2% | 2.5% | 3% | 3.5% |
| *Saccharomyces cerevisiae* | | | | |
| 374 (before) | 1.5 | 2.8 | 7.1 | 14.2 |
| 374 (after) | 1.6 | 4.7 | 58.3 | 1879.0 |
| 377 (before) | 1.6 | 3.4 | 16.0 | 75.0 |
| 377 (after) | 1.7 | 4.7 | 58.3 | 1878.0 |
| R4 (before) | 1.8 | 2.3 | 3.1 | 4.5 |
| R4 (after) | 2.6 | 4.6 | 12.4 | 106.3 |

EXAMPLE 3
Treatment of Whole Glucan with Laminarinase

Four hundred mg samples of whole glucan from *Saccharomyces cerevisiae* prepared as described in Example 1) from strains A364A, 374 and 377, were suspended in 400 ml of distilled water. Laminarinase (endo β(1–3) glucanase; Sigma Chemical Co.) in a concentration of 0.25 mg/ml in phosphate buffer at pH 7.0 was added. The solutions were incubated at 37° C. for 4 hours. At the end of the incubation the solutions were held at 70° C. for 15 minutes to deactivate the enzyme. The remaining residue was recovered by centrifugation at 5000 rpm for 20 minutes. The resulting glucan residues were diluted into a range of concentrations in order to obtain viscosity measurements of the laminarinase degraded glucan samples. Since the enzyme cannot be effectively removed from solution, a control experiment was performed as above containing the enzyme only. The readings from the control were used to correct the solvent viscosity accounting for the contribution of the enzyme to the macroscopic viscosity of the suspension. The results are shown in Table 5.

TABLE 5

Viscosity Profile of Glucans Before and After Treatment with Laminarinase

| Yeast Strain | Viscosity in Centipoise, 25° C. | | | |
|---|---|---|---|---|
| | 1% | 2% | 3% | 3.5% |
| *Saccharomyces Cerevisiae* | | | | |
| A364A (before) | 1.4 | 2.7 | 13.7 | 127.3 |
| A364A (after) | 1.2 | 1.6 | 3.1 | 6.4 |
| 374 (before) | 1.6 | 4.0 | 47.4 | 2630.7 |
| 374 (after) | 1.3 | 2.3 | 9.3 | 62.9 |
| 377 (before) | 1.6 | 3.4 | 16.0 | 75.0 |
| 377 (after) | 1.4 | 2.8 | 18.1 | 367.3 |

Figure 2:
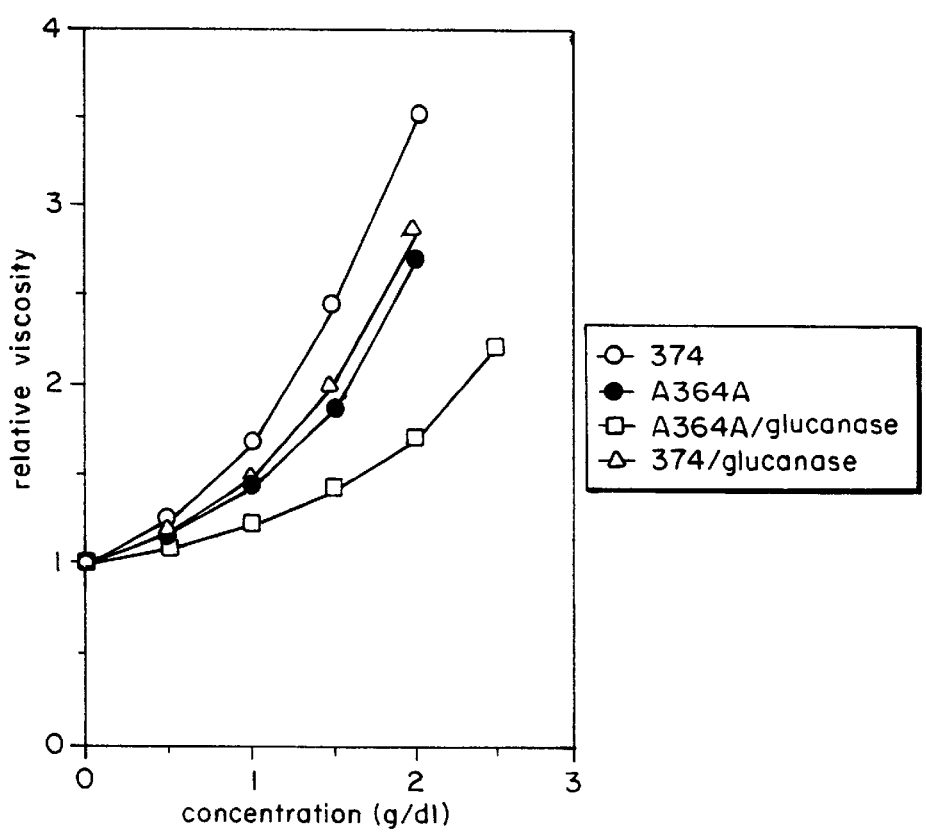
FIG. 2 shows a plot illustrating the viscosity profiles of whole β-glucan obtained from *Saccharomyces cerevisiae* A364A and 374 before and after treatment with laminarinase.

FIG. 2 shows the viscosity profile of glucan derived from strain A364A before and after a 4 hour laminarinase digest. Digestion of whole glucans with hydrolytic enzymes such as laminarinase will partially degrade their three-dimensional matrix structure thereby reducing their water-holding capacity. This procedure can be employed to produce β-glucans with high fiber/low bulking function.

EXAMPLE 4
Modification of Whole Glucan Cell Wall Structure Through Genetic Modification of the Producing Strain The following procedure is employed to produce and isolate mutant yeast cells having altered cell wall structures: *Saccharomyces cerevisiae* A364A is used in this example, however, other yeast strains may be used.

Strain A364A was grown in 100 ml YPD to mid-log phase. The cells were washed in buffer and divided into aliquots of approximately 5 ml in sterile glass petri plates. A UV exposure of 25 sec (30% survival) was used as the mutagenesis procedure. The cells were then suspended in 5 ml YEPD (1% yeast extract, 2% bacto peptone, 2% glucose) and grown under subdued light to a concentration of 5×10⁶ CFU/ml. The cells were harvested, and protoplasts were prepared using 0.25 mg/ml laminarinase for 30 minutes. The suspension was then diluted with water to lyse osmotically sensitive protoplasts. The surviving cells then were grown in 5 ml YPD to a density of approximately 5×10⁶ CFU/ml. The laminarinase treatment was repeated two more times using 1.0 mg/ml enzyme for 15 minutes. The candidates which resistance to laminarinase digestion were then streaked on YEPD agar (1.5%) plates. Single colony isolates were tested for resistance to the enzyme compared to the resistance of the control strain, A364A. The mutant referred to as R4, is available from the Agricultural Research Service, Number NRRL Y-15903. The water holding capacity of whole β-glucan derived from *Saccharomyces cerevisiae* strains A364A and R4 is shown in Table 6.

TABLE 6

THE WATER HOLDING CAPACITY OF GENETICALLY
MODIFIED (R-4) AND UNMODIFIED (A364A)
WHOLE GLUCANS

| Yeast Strain | Treatment | Water-holding capacity (ml/g dry material) |
| --- | --- | --- |
| A364A | none | 9.2 |
| A364A | acetic acid | 9.0 |
| A364A | laminarinase | 5.7 |
| R4 | none | 8.9 |
| R4 | acetic acid | 10.3 |
| R4 | laminarinase | 7.1 |

EXAMPLE 5
A Complete High-Fiber Liquid Food Containing Whole β-Glucan

A high fiber liquid food for oral or enteral feeding was formulated using whole glucan as the source of dietary fiber. The composition contained the following ingredients: distilled water, hydrolyzed corn starch, sucrose, sodium and calcium caseinates, corn oil, whole glucan, minerals (potassium citrate, magnesium chloride, calcium phosphate tribasic, sodium citrate, potassium chloride, zinc sulfate, ferrous sulfate, manganese sulfate, cupric sulfate), soy protein isolate, flavorings, soy lecithin and vitamins (choline chloride, ascorbic acid, alpha-tocophenyl acetate, niacinamide, calcium pantothenate, thiamine chloride hydrochloride, pyridoxine hydrochloride, riboflavin, vitamin A palmitate, folic acid, biotin, phylloquinone, cyanocobalamin, vitamin $D_3$).

The formulation was prepared by adding the following components to 4 fl. oz. of distilled water:

| Contents | grams |
| --- | --- |
| Sodium caseinate | 3.5 |
| Calcium caseinate | 5.9 |
| Corn Oil | 8.8 |
| Sucrose | 7.0 |
| Whole β-character glucan | 5.0 |
| Hydrolyzed corn starch | 26.3 |
| The following vitamins and minerals were added: | |
| Vitamin A | 850 I.U. |
| Vitamin D | 68 I.U. |
| Vitamin E | 7.7 I.U. |
| Vitamin K | 12 mcg |
| Vitamin C | 51 mg |
| Folic Acid | 102 mcg |
| Thiamine (Vitamin $B_1$) | 0.39 mg |
| Riboflavin (Vitamin $B_2$) | 0.44 mg |
| Vitamin $B_6$ | 0.51 mg |
| Vitamin $B_2$ | 1.6 mcg |
| Niacin | 5.1 mg |
| Choline | 102 mg |
| Biotin | 77 mcg |
| Pantothenic Acid | 2.55 mg |
| Sodium | 200 mg |
| Potassium | 370 mg |
| Chloride | 340 mg |
| Calcium | 170 mg |
| Phosphorus | 170 mg |
| Magnesium | 68 mg |
| Iodine | 25.5 mcg |
| Manganese | 0.85 mg |
| Copper | 0.34 mg |
| Zinc | 3.83 mg |
| Iron | 3.06 mg |

All components were mixed until dissolved or suspended in a homogenous mixture, and enough additional water was added to bring the volume to 8 fl. oz.

EXAMPLE 6
A Bulk Laxative Containing Whole β-Glucan

A bulk laxative was formulated by adding 5.0 g of whole β-glucan to 8 oz. of cold water, and stirring until the β-glucan was suspended in the water. This formulation can then be administered orally to a patient, up to 3 times daily to provide a laxative effect.

EXAMPLE 7
Method to Control the Bulking Properties of Whole Glucans by Chemical Modification The bulking properties of the whole glucans are a direct function of their hydrodynamic volume. However, degradation of the glucan matrix by hydrolytic enzymes present in the large intestine may significantly impair this property. It is therefore important to control the bulking properties and degradation of the glucan particles for a variety of applications.

Glucan particles were prepared according to the method of Jamas et al. (U.S. Pat. No. 4,810,646) from *Saccharomyces cerevisiae* 377. A portion of the glucan particles was further extracted by suspending 500 mg of the glucan in 250 ml of 0.5M acetic acid and stirring for 3 hours at 90° C. The whole glucan and the acetic extracted glucan were digested with a mixture of hydrolytic enzymes containing $\beta(1-4)$, $\beta(1-3)$ and $\beta(1-6)$ glucanase activities to simulate the conditions that the glucan will be exposed to in the large intestine. The bulking properties of the glucan before and after digestion were measured as was the amount of glucose released and the percent undigested fiber (see Table 7).

TABLE 7

PROPERTIES OF WHOLE
GLUCANS BEFORE AND AFTER DIGESTION

| PRODUCT | Initial Water Holding Capacity (ml/gram) | Final Water Holding Capacity (ml/gram) | Digestable Glucose (mg/gram) | % Undigested Glucan |
| --- | --- | --- | --- | --- |
| Untreated 377 | 9.1 | 6.5 | 250 | 75 |
| 377/acetic acid | 10.3 | 4.1 | 600 | 40 |

The two products, untreated 377 and 377 treated with acetic acid behave significantly differently under simulated conditions. The results show that the whole glucan, 377, will provide high bulking properties throughout its residence in the intestine and does not degrade significantly. The acetic acid-treated material is more susceptible to enzymatic hydrolysis, yielding a higher quantity of metabolizable glucose per gram of fiber (Table 8). In this case, the product will benefit patients with impaired bowel function in which the fiber will provide a low bulking component and considerable nutrition to the epithelial cells.

EXAMPLE 8
Method to Control Degradation of Whole Glucans By Modifying the Ratio of $\beta(1-6)$ to $\beta(1-3)$ Linkages The whole glucans consist of $\beta(1-3)$-linked glucose backbone chains with periodic $\beta(1-6)$ branching. The relative ratio of the $\beta(1-6)$ to $\beta(1-3)$ linkages in the glucan matrix determines its resistance to digestion by hydrolytic enzymes. The employment of mutant or genetically engineered strains with altered $\beta(1-6)$ linkages result in whole glucans with a range of properties as dietary fiber.

To demonstrate this, whole glucans from *Saccharomyces cerevisiae* strain A364A, and the mutant strain R4, were digested with a mixture of hydrolytic enzymes to simulate the conditions in the intestine. The results, shown in Table 8, illustrate how the ratio of linkages in the whole glucan can be used to produce a high bulking/low digestible fiber or a low bulking/high digestible fiber.

TABLE 8

THE EFFECT OF LINKAGE RATIO IN WHOLE GLUCANS
ON THEIR FUNCTION AS A DIETARY FIBER

| PRODUCT | Initial Water Holding Capacity (ml/gram) | Final Water Holding Capacity* (ml/gram) | Digestable Glucose (mg/gram) |
|---|---|---|---|
| A364A | 9.2 | 5.0 | 550 |
| R4 | 8.7 | 7.1 | 225 |

*After enzymatic digestion

The results above demonstrate how the A364A whole glucan is degraded considerable by the hydrolytic enzymes providing a high level of metabolizable glucose representing approximately 50% of the total fiber. The modified whole glucan of strain R4, which has an increased ratio of β(1–6) to β(1–3) linkages, is more resistant to the hydrolytic enzymes thus maintaining over 80% of its bulking properties and providing a lower quantity of metabolizable glucose.

EXAMPLE 9
The Effect of Dietary Whole Glucan on Serum Cholesterol Levels of Hypercholesterolemic Hamsters Syrian hamsters (*Mesocricetus auratus*) were chosen for their similarity to humans in blood lipoprotein profile. Forty hamsters were placed on a control diet for seven weeks. Control feed consisted of a Purina Mills Rodent Laboratory Chow (#5001) based diet to which was added 0.2% by weight cholesterol and 10% coconut oil. At seven weeks, hamsters were separated into four groups having means of total cholesterol between 267 mg/dl and 279 mg/dl. One group remained on the control diet. The other groups received a five percent by weight addition of oat bran, wheat bran or whole glucan (prepared as described in Example 1) to control diet for an additional six weeks.

Initial blood samples were drawn from each hamster after four weeks on control diet, after which time they were divided and immediately placed on the fiber-containing diets. At two consecutive intervals of 3–4 weeks all groups were bled again. All blood samples were obtained via the retro-orbital sinus and collected into heparinized tubes. Approximately 500 microliters of blood were collected from each hamster at each bleed.

Plasma was partitioned by low speed centrifugation. Plasma total cholesterol (TC), high density lipoprotein cholesterol (HDLC), low density lipoprotein cholesterol (LDLC) and triglycerides (TG) were measured by enzymatic assay on a Beckman 700 system, as previously described. T. O. Tiffany et al., *Clinical Chemistry*, 18:819 (1972); W. H. Karge et al., *The American Journal of Medicine*, 86:19–23 (1989).

Groups were tested for variance before being placed on fiber diets to ensure no initial statistical difference between mean values of total cholesterol. To evaluate the effect of each fiber, individual animals were used as their own control. An analysis of variance was performed to determine if there was an effect of type or level of fiber. A paired-t-test was applied across each group to examine the difference between means of the hamsters while on control feed and then on fiber treated feed. In each group changes in variables were tested for correlation by a Pearson correlation matrix. A means separation test (Newman/Kuels, Turkey) was then used to detect significant differences of effects on plasm lipoprotein cholesterol and body weight between groups and against a control average.

Figure 4:
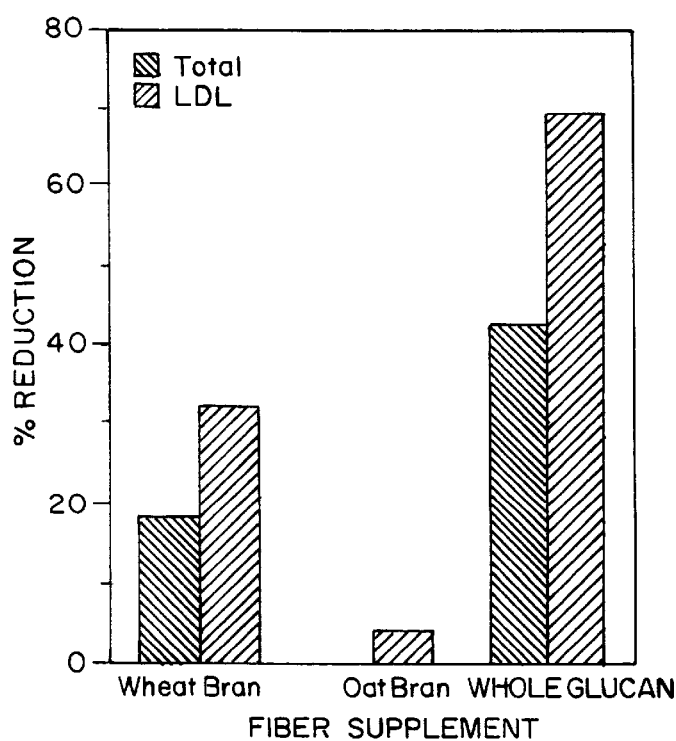
FIG. 4 is a graph illustrating the reduction in hamsters of total and LDL cholesterol obtained with whole glucan compared to wheat bran and oat bran.

No significant differences in pre-treated values for plasma cholesterol were observed between each treatment group due to randomization. Whole glucan fed at 5% by weight resulted in reductions in total cholesterol, (42%), LDL cholesterol, (69%) and a significant increase in HDL cholesterol (16%). Plasma triglycerides were not significantly altered by the whole glucan at this level. The results are shown in Table 9 and in FIG. 4.

TABLE 9

Effects of Dietary Fiber (5%) on Plasma Lipids and Lipoprotein Cholesterol

| Diet | N | TC | | HDLC | | LDLC | | TG | |
|---|---|---|---|---|---|---|---|---|---|
| | | Pre | Treated | Pre | Treated | Pre | Treated | Pre | Treated |
| | | mg/dl | | | | | | | |
| 5% Wheat | 9 | 272[a] ± 61 | 223 ± 37 | 110 ± 34 | 110 ± 23 | 162 ± 64 | 110 ± 39 | 99 ± 39 | 110 ± 44 |
| 5% Oat | 6 | 291 ± 61 | 304 ± 51 | 93 ± 16 | 114 ± 29 | 198 ± 61 | 190 ± 48 | 135 ± 72 | 94 ± 28 |
| 5% Whole Glucan | 9 | 308 ± 108 | 180[b] ± 34 | 98 ± 16 | 114[c] ± 15 | 210 ± 96 | 66[d] ± 29 | 114 ± 27 | 97 ± 48 |

[a]Values represent mean ± standard deviation of each diet group
[b]Significant at $P < .009$
[c]Significant at $P < .009$
[d]Significant at $P < .004$
TC = Total cholesterol
HDLC = High density lipoprotein cholesterol
LDLC = low density lipoprotein cholesterol
TG = Triglycerides EXAMPLE 10
The Effect of Whole Glucan on Serum Cholesterol Levels of Hamsters Twenty-four Syrian hamsters were fed a control diet consisting of Purina rodent chow (#5001) and after an initial plasma cholesterol determination (see Example 9), were divided into 8 groups and randomized so that initial pre-treatment plasma cholesterol levels were not significantly different from each other. Afterward, all animals were placed on a hypercholesterolemic chow-based diet containing 10% coconut oil plus 0.2% cholesterol, and either no added fiber (control group) or containing 5% oat bran or 5% whole glucan. After 4 weeks, animals were bled and plasma lipoprotein cholesterol and triglycerides were analyzed as described in Example 9.

The results, shown in Table 1 0, indicate that whole glucan reduced total cholesterol by 13% compared to only 6% with oat bran. LDL was reduced by 15% in the whole glucan group compared to 4% in the oat bran group.

TABLE 10

PLASMA LIPID PROFILES OF HAMSTERS FED A HIGH CHOLESTEROL DIET SUPPLEMENTED WITH OAT FIBER OR WHOLE GLUCAN

| Treatment | Control | Oat Bran | Whole Glucan |
|---|---|---|---|
| Added Fiber (wt/wt) | 0 | 5% | 5% |
| Total Chol. (mg/dl) | 238 ± 47* | 224 ± 48 | 208 ± 25 |
| LDL Chol. (mg/dl) | 114 ± 52 | 110 ± 37 | 97 ± 37 |
| HDL Chol. (mg/dl) | 124 ± 24 | 114 ± 30 | 111 ± 20 |
| Triglycerides (mg/dl) | 135 ± 43 | 99 ± 38 | 74 ± 17 |

*Values represent Mean ± Standard Deviation for 8 animals per group

EXAMPLE 11

Administration of Whole Glucan to Hamsters on a Pre-Established High-Fat Diet

Thirty-three Syrian hamsters (*Mesocricetus auratus*) were placed on a high-fat diet (Purina Mills Rodent Laboratory Chow #5001 with 0.2% by weight cholesterol and 10% by weight coconut oil) for seven weeks. On the seventh week the hamsters were separated into four groups and the body weight of each hamster was recorded. Three of the groups then received 5% by weight of either wheat bran, oat bran or whole glucan (prepared as a described in Example 1) in their high-fat diets. The fourth control group continued on the original diet with no additional fiber supplement. After six weeks the body weights of the hamsters were recorded. The results are shown in Table 11.

TABLE 11

EFFECT OF DIETARY FIBER ON BODY WEIGHT

| Diet Group | Number of Animals | Body weight[a] (grams) | |
|---|---|---|---|
| | | Pre | Treated |
| Wheat Bran | 9 | 108 ± 12 | 100 ± 8[b] |
| Oat Bran | 6 | 102 ± 6 | 113 ± 11[c] |
| Whole Glucan | 9 | 112 ± 8 | 91 ± 6[d] |
| Control | 9 | 111 ± 7 | 108 ± 6 |

[a]Values Represent Mean ± Standard Deviation
[b]Significant at $P < .021$
[c]Significant at $P < .025$
[d]Significant at $P < .001$ As shown in Table 11, whole glucan effected significantly higher weight loss compared to either oat bran or wheat bran.

EXAMPLE 12

Effect of Whole Glucan on Weight Gain of Rats

Sixty male Sprague-Dawley rats were separated into six groups with similar average body weights. Each group was assigned to one of six diets which differed by the source and/or proportion of fiber added to them: control (no fiber), cellulose (5%), oat bran (43%) and whole glucan at 1%, 4% and 8% by weight. All the diets were based on the AIN 76A diet as described in "Dietary Fiber and Health", *JAMA*, 262:542–546 (1989) and by Shinnich et al., in *J. Nutr.*, 118:144–151 (1988) and contained 1% by weight cholesterol and 0.2% by weight cholic acid. As oat bran contains 18.6% dietary fiber, the oat group diet contained 43% by weight oat bran so as to compare to the 8% whole glucan diet. The animals were maintained on their respective diets for 20 days. Initial and final body weights and daily food intake were monitored and are shown in Table 12.

TABLE 12

THE EFFECT OF WHOLE GLUCAN ON 20 DAY WEIGHT GAIN IN RATS

| 20 Fiber | Initial Weight (g) | Final Weight (g) | Feed Intake (g) | 20 Day Weight Gain |
|---|---|---|---|---|
| No Fiber | 263.0 ± 9.55 | 344.5 ± 21.4 | 16.25 ± 1.64 | 81.5 ± 15.3 |
| Cellulose (5%) | 262.6 ± 7.96 | 339.3 ± 11.0 | 17.59 ± 0.72 | 76.7 ± 6.6 |
| Oat Bran (43%) | 262.9 ± 8.08 | 336.2 ± 15.3 | 16.69 ± 1.05 | 73.3 ± 9.4 |
| Whole Glucan (1%) | 262.7 ± 8.33 | 336.6 ± 18.0 | 16.10 ± 1.46 | 73.9 ± 11.5 |
| Whole Glucan (4%) | 262.5 ± 7.69 | 331.2 ± 19.0 | 16.48 ± 1.29 | 68.7 ± 14.3 |
| Whole Glucan (8%) | 263.5 + 10.62 | 318.7 ± 11.8[a] | 15.82 ± 1.52 | 55.2 ± 11.4[a] |

[a]Significant at $P < 0.05$ (Two tailed Dunnett Test)

As shown in Table 12, only whole glucan at 8% by weight of the diet resulted in a significant reduction in weight gain without requiring a statistically significant reduction in food intake. Surprisingly, the oat bran did not induce significant reduction in weight gain even at the 43% level.

EXAMPLE 13

The Effect of Dietary Whole Glucan on Serum Cholesterol Levels of Hypercholesterolemic Human Males Male subjects were selected from an obese population seen at Beth Israel Deaconess Medical Center's Nutrition Research Clinic; others responded to local newspaper advertisements. At entry, subjects were between the ages of 20 and 60, were at least 120% of ideal weight, and had serum TC concentrations over 6.21 mmol/L (240 mg/dL). Candidates taking cholesterol-lowering medication or having secondary causes of hyperlipidemia such as hypothyroidism, diabetes mellitus, or renal disease were excluded from the study. The study protocol was approved by the Beth Israel Deaconess Medical Center Institutional Review Board.

Nineteen male subjects entered the study, but four of the 15 subjects dropped out during the 3-week wash-in period. A total of 15 subjects completed the study and had blood lipid data available for basal values, week 7, week 8, and week 12. Of the 15 subjects who completed the study, only 12 of them had data relating to anthorpometry, nutrient intake and clinical tolerance.

Study Design and Measurements

Each subject had three fasting blood samples drawn weekly over 3 weeks for measurement of TC and triglycerides (TGs). These measurements were then averaged as the basal values for each patient. Both TC and high-density lipoprotein-cholesterol 25 (HDL-C) were measured directly. The concentrations of LDL-C (mg/dL) were calculated according to the method of Friedewald et al., *Clin. Chem.*, 18:499–502 (1972): LDL-C=TC–HDL-C-(triglycerides/5). Cholesterol was converted from mg/dL to mmol/L by multiplying by 0.2586. Plasma TGs were converted from mg/dL to mmol/L by multiplying by 0.0112. After the third blood sample, subjects were instructed how to take 15g of the yeast derived β-glucan fiber in pre-weighed containers of 7.5 g and add it to orange juice twice a day. Subjects returned weekly for 8 weeks to be weighed and to obtain more fiber. They were not instructed to follow a special diet. Subjects completed weekly 3-day food records during the baseline (3 weeks) and treatment periods (8 weeks). Fiber intake was confirmed by the number of empty containers returned. At week 7 and 8, 12-hour fasting levels of plasma TC, HDL-C, and TGs were measured. Fiber supplementation stopped after 8 weeks, but the subjects continued consuming the same amount of orange juice. Four weeks later (week 12), the subjects were weighed and had another fasting blood sample taken for TC, HDL-C, and TGs measurement.

Each week the fiber was consumed, subjects completed questionnaires designed to gauge the effect of the product. Assessment was made of (1) the degree of satiety (when the subject felt fullness, general feeling of fullness throughout the day, (2) product tolerance (abdominal discomfort, diarrhea, nausea, vomiting, and flatulence), and (3) product acceptability (thickness, consistency, color, flavor, aroma, and aftertaste). Satiety was rated on a scale of 0 to 10, with 0 being "hungry" and 10 being "extremely full". Tolerance was assessed at four levels: 0 for no adverse effects, 1 for slight awareness, 2 for moderate discomfort, and 3 for marked discomfort. Product acceptability was rated on a scale of 1 to 9, with one being the worst attribute (e.g., gritty-chalky consistency) and 9 the best attribute (e.g., smooth consistency).

Statistical Analyses

Data were presented as means ± standard deviation (SD), except for satiety, tolerance, and acceptability, which were presented as means and medians. One-way ANOVA was used for univariate and multivariate repeated measures analysis (more than one measurement on each subject) using SYSTAT statistical software program (SYSTAT, Evanston, Illinois). The significance was determined at the 95% confidence level. Group comparison between the baseline value and each of the treatment (week 7, week 8 and post-treatment [week 12]) weeks was determined by Bonferroni corrections, only when ANOVA, as defined above, was found to be significant.

Results

A total of fifteen subjects completed the study. Subjects were middle-aged (51±7 years) and were overweight in terms of BMI (27.7±5 kg/m$^2$). Nutrient intake during the baseline and fiber-treatment periods was not difference (9.23±2.16 MJ baseline versus 11.6±1.61 MJ during treatment) except for the fiber supplement during the treatment phase. All subjects consumed 15 g of fiber daily in addition to their usual diet during the 8-week study period. Subjects consumed sufficient energy to maintain their body weight during the study.

Changes in Plasma Lipids

Significant differences were found in TC concentrations ($p<0.05$), LDL-C ($p<0.001$), and HDL-C ($p<0.005$) by one-way ANOVA with repeated measures. After 7 weeks of fiber supplementation, serum TC was significantly lower (8%) than baseline (6.38±0.44 mmol/L versus 5.90±0.68 mmol/L) ($p<0.05$ by Bonferroni correction). At week 8, TC was 5.98±0.57 mmol/L, which was also significantly lower (6%) than baseline ($p<0.01$ by Bonferroni correction). There was no difference in TC between baseline and week 12.

During the study period, the levels of HDL-C were significantly increased ($p<0.005$ by one-way ANOVA). The mean concentration tended to increase (9%) from 0.87±0.25 mmol/L at the basal period to 0.96±0.26 mmol/L at week 8. However, a group difference was only observed between basal and week 12 ($p<0.05$ with Bonferroni correction), indicating a carryover effect even though the fiber supplementation had stopped 4 weeks earlier. There was a 16% increase in HDL-C at week 12 compared to baseline values.

For LDL-C concentration, no significant differences were observed between vasal values and weeks 7, 8 and 12 when comparing individual groups using Bonferroni correction even though the overall ANOVA with repeated measures as highly significant ($p<0.001$). Compared to baseline values, LDL-C tended to decline to 5% at week 7 and 8% at week 8.

The mean ratio of TC/HDL-C declined during fiber supplementation, which was marginally significant ($p=0.06$) by one-way ANOVA with repeated measures analysis. However, this ratio was significant ($p<0.05$) by the single degree-of-freedom polynomial contrast. Fiber supplementation let to a reduction in the ratio of TC/HDL-C from 8.2 to 7.3 at week 7 ($p<0.05$ with Bonferroni correction) and to 7.0 at week 8 ($p<0.05$ with Bonferroni correction). This ratio returned to basal value at week 12. The results of the clinical study are shown in Table 13.

Satiety, Tolerance, Acceptability

Data were available for 12 of the 15 participants. Six of the twelve subjects stated that they never felt full after taking the fiber supplement, five of the twelve felt full 5 to 20 minutes after ingestion. The remainder felt full from 20 to 60 minutes after ingestion. Most subjects (8/12) stated that beyond 3 hours after ingestion of the fiber they had no feeling of fullness. When subjects rated fullness on a scale of 1 to 10, mean fullness ranged from 2.8 out of 10, three hours after ingestion of the fiber to 3.9 out of 10, one hour after ingestion.

The effect of the fiber on diarrhea, nausea, abdominal discomfort, abdominal distension and flatulence was minimal (less than 1, indicating slight awareness of symptoms easily tolerated). There were no reports of vomiting.

The product was moderately well accepted. Each of the six attributes rated (thickness, consistency, color, flavor, aroma and aftertaste) had a mean and median of 4 to 5 on a scale of 0 to 9.

TABLE 13

WHOLE GLUCAN CLINICAL RESULTS

|  | Baseline | Week 8 | Week 12 |
| --- | --- | --- | --- |
| Cholesterol[a] (mg/dL) | 247 ± 17 | 231 ± 22 | 240 ± 34 |
| LDL-C[b] (mg/dL) | 158 ± 24 | 145 ± 26 | 166 ± 29 |
| HDL-C[c] (mg/dL) | 34 ± 10 | 37 ± 10 | 40 ± 10 |

[a]$p < 0.05$ ANOVA
[b]$p < 0.001$ ANOVA
[c]$p < 0.05$ ANOVA

Those skilled in the art will recognize, or be able to ascertain using no more than routine experimentation, many equivalents to the specific embodiments of the invention described herein. Such equivalents are intended to be encompassed in the scope of the following claims.

What is claimed is:

1. A dietary supplement for administration to mammals comprising an amount of whole β-glucan sufficient to increase high density lipoprotein cholesterol level in said mammal.

2. The dietary supplement of claim 1 wherein the whole β-glucan has been chemically modified by treatment with acid.

3. The dietary supplement of claim 2 wherein the acid comprises acetic acid.

4. The dietary supplement of claim 1 wherein the whole β-glucan has been enzymatically modified by treatment with a β-glucanase enzyme.

5. The dietary supplement of claim 4 wherein the β-glucanase enzyme is laminarinase.

6. The dietary supplement of claim 1 wherein the whole β-glucan comprises altered β-glucan derived from yeast cells which have been genetically modified.

7. The dietary supplement of claim 1 which contains about 5 to about 50 grams of whole β-glucan.

8. The dietary supplement of claim 7 wherein the amount of whole β-glucan is from about 5% to about 8% by weight of total dietary intake.

9. A method of providing a source of fiber in a diet of a mammal comprising administering to the subject an amount of whole yeast β-glucan sufficient to increase high density lipoprotein cholesterol level in the mammal.

10. The method of claim 9 wherein the whole yeast β-glucan is in a biologically acceptable carrier.

11. The method of claim 10 wherein the carrier is sterile saline or water, and the composition is administered orally or through a feeding tube.

12. The method of claim 10 wherein the whole yeast β-glucan is administered to the subject as part of a complete nutritional food formulation.

13. The method of claim 10 wherein the bulking and digestibility of the fiber is controlled by modifying the relative proportion of β(1–3) and β(1–6) linkages.

14. The method of claim 13 wherein the amount of whole β-glucan administered is from about 5 to 50 grams per day.

15. A method of increasing HDL cholesterol in a human or animal comprising administering to the human or animal an amount of whole yeast β-glucan sufficient to cause an increase in HDL cholesterol in the human or animal.

16. The method of claim 15 wherein the whole yeast β-glucan is derived from a strain of *S. cerevisiae*.

17. The method of claim 15 wherein the amount of whole β-glucan administered comprises from about 5% to about 8% by weight of the total dietary intake of the human or animal.

18. The method of claim 15 wherein the whole yeast β-glucan is in a biologically acceptable carrier.

19. The method of claim 18 wherein the biologically acceptable carrier comprises cornstarch.

20. The method of claim 19 wherein the whole yeast β-glucan is contained in a chewable tablet.

* * * * *